(12) United States Patent
Hessling-Von Heimendahl et al.

(10) Patent No.: US 11,993,395 B2
(45) Date of Patent: May 28, 2024

(54) AIRCRAFT HEADLIGHT, AIRCRAFT COMPRISING AN AIRCRAFT HEADLIGHT, AND METHOD OF OPERATING AN AIRCRAFT HEADLIGHT

(71) Applicant: Goodrich Lighting Systems GmbH & Co. KG, Lippstadt (DE)

(72) Inventors: Andre Hessling-Von Heimendahl, Koblenz (DE); Carsten Pawliczek, Lippstadt (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 0 days.

(21) Appl. No.: 17/896,334

(22) Filed: Aug. 26, 2022

(65) Prior Publication Data
US 2023/0067789 A1   Mar. 2, 2023

(30) Foreign Application Priority Data
Aug. 27, 2021  (EP) .................................... 21193468

(51) Int. Cl.
*F21S 45/60*   (2018.01)
*B64D 47/02*   (2006.01)
(Continued)

(52) U.S. Cl.
CPC .............. *B64D 47/04* (2013.01); *F21S 41/28* (2018.01); *F21S 45/60* (2018.01); *F21V 29/90* (2015.01); *B64D 15/12* (2013.01)

(58) Field of Classification Search
CPC ........ B64D 47/02; B64D 47/04; B64D 47/06; F21S 45/60; F21V 29/90
See application file for complete search history.

(56) References Cited

U.S. PATENT DOCUMENTS

RE36,468 E   12/1999   Chew et al.
6,092,765 A   7/2000   White
(Continued)

FOREIGN PATENT DOCUMENTS

DE   10110142 A1   11/2002
DE   102004031033 A1 *   1/2006   ........... B60Q 1/0017
(Continued)

OTHER PUBLICATIONS

Abstract for EP3789661 (A1), Published: Mar. 10, 2021, 1 page.
(Continued)

*Primary Examiner* — Sean P Gramling
(74) *Attorney, Agent, or Firm* — CANTOR COLBURN LLP (57) ABSTRACT

An aircraft headlight includes at least one visible light source for emitting a headlight light output; a light transmissive cover, at least partially covering the at least one visible light source; and at least one infrared emitter for emitting infrared radiation. At least 90% of radiation energy, comprised in the infrared radiation emitted by the at least infrared emitter, is emitted within a predefined wavelength range; and the light transmissive cover allows at least 25%, in particular at least 30%, more particularly at least 45%, of the radiation energy, which is emitted within the predefined wavelength range, to pass through the light transmissive cover.

16 Claims, 8 Drawing Sheets

(51) Int. Cl.
*B64D 47/04* (2006.01)
*F21S 41/20* (2018.01)
*F21V 29/90* (2015.01)
*B64D 15/12* (2006.01)

(56) References Cited

U.S. PATENT DOCUMENTS

| | | |
|---|---|---|
| 8,246,205 B2 | 8/2012 | Lai |
| 2003/0086251 A1 | 5/2003 | Hamilton |
| 2004/0070339 A1* | 4/2004 | Suda ............ H05B 3/145 |
| | | 313/578 |
| 2013/0249375 A1 | 9/2013 | Panagotacos |

FOREIGN PATENT DOCUMENTS

| | | |
|---|---|---|
| DE | 102011001867 A1 | 10/2012 |
| DE | 102014110841 A1 | 2/2016 |
| EP | 1632714 A2 | 3/2006 |
| EP | 3789661 A1 | 3/2021 |
| GB | 2004045 A * | 3/1979 ............ F21S 48/155 |
| RU | 2753977 C1 | 8/2021 |

OTHER PUBLICATIONS

Abstract for DE10110142 (A1), Published: Nov. 14, 2002, 1 page.
Abstract for DE102011001867 (A1), Published: Oct. 11, 2012, 1 page.
Abstract for DE102014110841 (A1); Published: Feb. 4, 2016, 1 page.
Abstract for EP1632714 (A2), Published: Mar. 8, 2006, 1 page.
Abstract for RU2753977 (C1), Published: Aug. 25, 2021, 1 page.
Extended European Search Report for Application No. 21193468.2, dated Feb. 11, 2022, 8 pages.

* cited by examiner

AIRCRAFT HEADLIGHT, AIRCRAFT COMPRISING AN AIRCRAFT HEADLIGHT, AND METHOD OF OPERATING AN AIRCRAFT HEADLIGHT

CROSS-REFERENCE TO RELATED APPLICATIONS

This application claims priority to European Patent Application No. 21193468.2 filed Aug. 27, 2021, the entire contents of which is incorporated herein by reference.

TECHNICAL FIELD

The present invention is in the field of exterior aircraft lights. The present invention is in particular related to an aircraft headlight, to an aircraft comprising such an aircraft headlight, and to a method of operating such an aircraft headlight.

BACKGROUND

Almost all aircraft are equipped with exterior aircraft lights. In particular, large passenger air planes have a wide variety of exterior aircraft lights. Examples of such exterior aircraft lights include aircraft headlights such as take-off lights, landing lights, taxi lights, and/or runway turn-off lights.

Low ambient temperatures may result in ice forming on the exterior surfaces of such exterior aircraft lights. Ice forming on a light emission surface of an exterior aircraft light may cause a deterioration of the light output provided by the exterior aircraft light. This may result in unsafe conditions due to an insufficient illumi-nation of areas in front of and/or next to the aircraft.

It therefore would be beneficial to provide an exterior aircraft light which allows for removing ice, which potentially deteriorates the light output of the exterior aircraft light, in a fast and reliable manner.

SUMMARY

Exemplary embodiments of the invention include an aircraft headlight comprises at least one visible light source for emitting a headlight light output; a light transmissive cover, which at least partially covers the at least one visible light source; and at least one infrared emitter for emitting infrared radiation. According to an exemplary embodiment of the invention, at least 90% of the radiation energy, which is comprised in the infrared radiation emitted by the at least infrared emitter, is emitted by infrared radiation within a predefined wavelength range, and the light transmissive cover allows at least 25%, in particular at least 30%, more particularly at least 45%, of the radiation energy, which is emitted within the predefined wavelength range, to pass through the light transmissive cover.

Exemplary embodiments of the invention also include aircraft comprising at least one aircraft headlight according to an exemplary embodiment of the invention. Such aircraft may include air planes and helicopters.

The at least one infrared emitter allows for removing ice, formed on the light transmissive cover, fast and efficiently by heating and melting the ice with infrared radiation emitted by the at least one infrared emitter. As the light transmissive cover allows at least 25%, in particular at least 30%, more particularly at least 45%, of the radiation energy, which is emitted by the at least one infrared emitter, to pass through the light transmissive cover, the infrared emitter is very efficient in melting the ice. Instead of heating the light transmissive cover, a large portion of the the infrared radiation may heat the ice directly, thus contributing to a highly efficient and fast melting of the ice.

As a result, ice formed on the light transmissive cover, which may deteriorate the emission of the visible aircraft headlight output, may be removed within a short period of time, after the at least one infrared emitter has been activated. In consequence, the full light output of the aircraft headlight, which allows for a safe operation of the aircraft even in dark environments, may be restored/achieved within a short period of time.

In an embodiment, at least 80% of the headlight light output, gener-ated by the at least one visible light source, is visible light. A visible light source producing/contributing to a headlight light output comprising at least 80% of visible light does not produce a large amount of waste heat and therefore may be operated very efficiently.

In an embodiment, the visible light source is an LED or comprises one or more LEDs. LEDs are very efficient in generating visible light without producing a large amount of waste heat.

In an embodiment, the predefined wavelength range is a range from 1500 nm to 3000 nm. The predefined wavelength range may in particular be a range from 2600 nm to 3000 nm.

Ice has a large absorption coefficient for electromagnetic radiation having wavelengths in the range of 1500 nm to 3000 nm, in particular for electromagnetic radiation having wavelengths in the range from 2600 nm to 3000 nm. A large absorption coefficient means that a large percentage of the energy of electromagnetic radiation, having wavelengths in the range of 1500 nm to 3000 nm, is absorbed by ice. In consequence, electromagnetic radiation having wavelengths in this range is very efficient in melting ice.

In an embodiment, the light transmissive cover is made from a material comprising quartz and/or silica. The light transmissive cover may in particular be made from a material comprising at least one of N-B270 glass, N-BK7 glass, pure silica glass, IR-Quartz glass and fused silica glass.

Quartz, silica, N-B270 glass, N-BK7 glass, pure silica glass, IR-Quartz glass and fused silica glass all have low absorption coefficients for infrared radiation, in particular for infrared radiation having wavelengths in the range of 1500 nm to 3000 nm, more particularly for infrared radiation having wavelengths in the range from 2600 nm to 3000 nm.

A low absorption coefficient means that a light transmissive cover made from these materials is highly transmissive for infrared radiation having wavelengths in the above mentioned ranges. As a result, a large portion of infrared radiation, having wavelengths in the above mentioned ranges, passes the light transmissive cover and reaches the ice, where it is absorbed for melting the ice, as it has been described before. Thus, forming the light transmissive cover from materials including quartz, silica, N-B270 glass, N-BK7 glass, pure silica glass, IR-Quartz glass and/or fused silica glass may contribute to efficiently melting any ice formed on the light transmissive cover by operating the at least one infrared emitter.

In an embodiment, the at least one infrared emitter is or includes at least one carbon infrared light emitter. Carbon infrared emitters are very efficient in producing infrared radiation having wavelengths in the above mentioned ranges, which are highly efficient for melting ice. Carbon infrared emitters further have short start-up times reaching their maximum power output within only a few seconds after being activated, for example within only 5 seconds, in particular within 2 to 3 seconds, after being activated.

In an embodiment, the at least one infrared emitter has a power capacity in the range of 100 W to 240 W. Infrared emitters having a power capacity in this range are very efficient in melting ice formed on the light transmissive cover within a short period of time.

In an embodiment, the at least one infrared emitter has a longitudinal dimension or length in the range of 25 mm to 100 mm, in particular a longitudinal dimension in the range of 25 mm to 75 mm, more particularly a longitudinal dimension in the range of 45 mm to 55 mm, for example 50 mm. Infrared emitters having these dimensions are well suited for being installed within an aircraft headlight.

In an embodiment, the aircraft headlight is an aircraft landing light and the at least one visible light source is at least one landing light source. An aircraft landing light is typically activated only a comparably short time before the aircraft lands, and it ideally provides a desired landing light output within a short period of time after being activated. Implementing an aircraft landing light as an aircraft headlight according to an embodiment of the invention may allow for removing the ice, which may have formed on the light transmissive cover of the aircraft landing light, within a short period of time, so that the aircraft landing light is able to provide the desired landing light output within said short period of time. Providing the desired landing light output within said short period of time, even when ice has formed on the aircraft landing light, en-hances the safety of the aircraft, in particular the safety of the landing procedure of the aircraft.

Aircraft headlights according to exemplary embodiments of the invention may also be implemented as take-off lights, taxi lights or runway turn-off lights. The features described herein may also provide reliable operability of these aircraft lights, even at cold ambient temperatures, shortly after these lights have been activated.

In an embodiment, the at least one infrared emitter is configured for irradiating the emitted infrared radiation onto at least one selected portion of the light transmissive cover. The at least one selected portion may cover only a portion of the complete light transmissive area of the light transmissive cover. The at least one selected portion of the light transmissive cover may in particular include at least those portions of the light transmissive cover which are passed by at least 90% of the headlight light output.

Such a configuration may allow for concentrating the infrared radiation, emitted by the infrared emitter, onto those areas of the light transmissive cover, which are passed by most of, in particular by at least 90% of the headlight light output. As a result, ice may be removed first from these areas, which are the most important areas for providing the desired headlight light output. Thus, in such a configuration, the infrared radiation, emitted by the at least one infrared emitter, may be used very efficiently for allowing the aircraft headlight to provide the desired headlight light output within a short period of time.

In an embodiment, the at least one infrared emitter is configured for irradiating the at least one selected portion of the light transmissive cover with an energy density of at least 0.155 W/cm2 (1 W/inch2), in particular with an energy density of at least 0.310 W/cm2 (2 W/inch2). Such energy densities have been found as very efficient for deicing the light transmissive cover within a short period of time, without overloading the electric power supply system of the aircraft.

In an embodiment, the at least one infrared emitter is configured for irradiating the at least one selected portion of the light transmissive cover with an energy density of at most 3.1 W/cm2 (20 W/inch2).

In an embodiment, the at least one infrared emitter is arranged closer to the light transmissive cover than to the at least one visible light source. In other words, the minimum distance between the at least one infrared emitter and the light transmissive cover is smaller than the minimum distance between the at least one infrared emitter and the visible light source.

In an embodiment, the distance between the at least one infrared emitter and the light transmissive cover is in the range of 35 mm to 350 mm.

In an embodiment, the distance between the at least one infrared emitter and the at least one landing light source is in the range of 50 mm to 500 mm.

Such a configuration may allow for reducing the amount of infrared radiation absorbed by the visible light source and/or by structural parts supporting the visible light source. In consequence, an undesirable heating of the visible light source by means of infrared radiation emitted from the at least one infrared emitter may be reduced.

In an embodiment, the aircraft headlight is configured such that the headlight light output, which is emitted by the at least one visible light source, passes the light transmissive cover in a first direction, and the at least one infrared emitter is arranged such that the at least one infrared emitter irradiates infrared light onto the light transmissive cover in a second direction, wherein the second direction is inclined with respect to the first direction. The terms in a first direction and in a second direction are not intended to mean that the headlight light output and the infrared light are concen-trated in a geometric direction. Rather, the terminology used is intended to mean that the headlight light output is provided around a first geometric direction and the infrared light is provided around a second geometric direction, with the first and second geometric directions being inclined with respect to each other.

In an embodiment, the angle between the first and second directions is larger than 30°, the angle between the first and second directions may in particular be larger than 45°, the angle between the first and second directions may more particularly be in a range of between 60° and 90°.

Such a configuration, in which the visible light output and the infrared radiation are emitted non-parallel but at an angle $\alpha > 0°$ with respect to each other towards the light transmissive cover, may allow for a flexible arrangement of the infrared emitter with respect to the visible light source. The infrared emitter may in particular be arranged in a position and orientation which allow for efficiently irradiating those portions of the light transmissive cover with infrared light which are most important for generating the desired headlight light output, i.e. those portions of the light transmissive cover which are passed by most of the headlight light output.

In an embodiment, the light transmissive cover has an outer light output surface, an opposing inner light input surface and at least one lateral surface extending between the outer light output surface and the inner light input surface. In this embodiment, the at least one visible light source is arranged opposite to the inner light input surface so that the headlight light output, emitted from the at least one visible light source, enters into the light transmissive cover through the inner light input surface, passes the light transmissive cover, and exits from the light transmissive cover through the outer light output surface. The at least one infrared emitter is arranged at the at least one lateral surface of the light transmissive cover so that the infrared radiation emitted from the at least one infrared emitter enters through the lateral surface into the light transmissive cover.

Such an arrangement of the at least one infrared emitter with respect to the light transmissive cover may allow for very compact configuration of the aircraft headlight and for a very efficient use of the at least one infrared emitter.

In an embodiment, the at least one visible light source and the at least one infrared emitter are switchable independently of each other, i.e. the at least one visible light source and the at least one infrared emitter may be activated and deactivated independently of each other. This may allow for activating the at least one infrared emitter only if necessary, i.e. only if the ambient temperatures are below the freezing point. It further may allow for deactivating the at least one infrared emitter, after the ice on the light transmissive cover has been removed. As a result, it is possible to avoid a waste of energy by unnecessarily operating the at least one infrared emitter, and the lifetime of the at least one infrared emitter may be extended, as unnecessary operation of the at least one infrared emitter may be avoided.

In an embodiment, the aircraft headlight further comprises at least one temperature sensor and a controller. The controller may be configured for activating and deactivating the at least one infrared emitter based on temperatures detected by the at least one temperature sensor.

In such a configuration, the at least one infrared emitter may be activated if the temperature detected by the at least one temperature sensor is below a predefined threshold, for example a threshold of 0° C. or a threshold in the range of between 0° C. and +5° C.

Further, the controller may be configured for activating the at least one infrared emitter only for a predefined period of time, which is sufficient for melting the ice formed on the light transmissive cover.

Additionally or alternatively, the at least one infrared emitter may by activated and/or deactivated by a manual switch provided in the cockpit of the aircraft.

In an embodiment, the controller may be configured for activating the at least one infrared emitter not simultaneously with the at least one visible light source, but a predefined period of time after the at least one visible light source has been activated. In other words, there may be a delay between activating the at least one infrared emitter and activating the at least one visible light source.

The delay/predefined period of time may be in the range of between 0.5 s and 3 s, in particular in the range of between 0.75 s and 1.5 s.

By activating the visible light source and the infrared emitter not simultaneously, but sequentially one after the other, a peak in power consumption, which may be caused by activating the light sources, may be flattened. In consequence, the risk of overloading the power supply system of the aircraft, which might occur if the light sources are activated simultaneously, may be reduced.

In an embodiment, the at least one visible light source and the at least one infrared emitter are operable with electric AC power having a voltage of between 100 V and 130 V, in particular a voltage of 115 V, and/or with electric DC power having a voltage of between 20 V and 40 V, in particular a voltage of 28 V. This may allow for installing and operating the aircraft headlight in different kinds of aircraft, in particular in aircraft having different types of electric power supply systems.

Exemplary embodiments of the invention further include a method of operating an aircraft headlight comprising at least one visible light source, a light transmissive cover, and at least one infrared emitter, wherein the method comprises: emitting a visible headlight light output through the light transmissive cover, and emitting infrared radiation onto the light transmissive cover. At least 90% of radiation energy comprised in the infrared radiation is emitted by infrared radiation within a predefined wavelength range, and the light transmissive cover allows at least 25%, in particular at least 30%, more particularly at least 45%, of the radiation energy, which is emitted within the predefined wavelength range, to pass through the light transmissive cover.

In an embodiment, the method includes activating the at least one infrared emitter and the at least one landing light source, and the method further includes deactivating the at least one infrared emitter some time after the at least one infrared emitter and the at least one landing light source have been activated.

Alternatively or additionally, the method may include detecting a temperature within the aircraft headlight, in particular a temperature at the light transmissive cover, and deactivating the at least one infrared emitter after a predetermined temperature has been reached.

Such a method may allow for a very efficient operation of the at least one infrared emitter. It may in particular avoid unnecessarily operating the at least one infrared emitter, after the ice has been melted and removed from the light transmissive cover.

In an embodiment, the method includes activating the at least one infrared emitter not simultaneously with the at least one visible light source, but a predefined period of time after the at least one landing light source has been activated. The predefined period of time may by in the range of between 0.5 s and 3 s, in particular in the range of between 0.75 s and 1.5 s.

By activating the visible light source and the infrared emitter not simultaneously, but sequentially one after the other, a peak in power consumption, which may be caused by activating the light sources, may be flattened. In consequence, the risk of overloading the aircraft's power supply, which might occur if the light sources are activated simultaneously, may be reduced.

BRIEF DESCRIPTION OF THE DRAWINGS

Further exemplary embodiments of the invention are described below with respect to the accompanying drawings, wherein.

DETAILED DESCRIPTION

Figure 1:
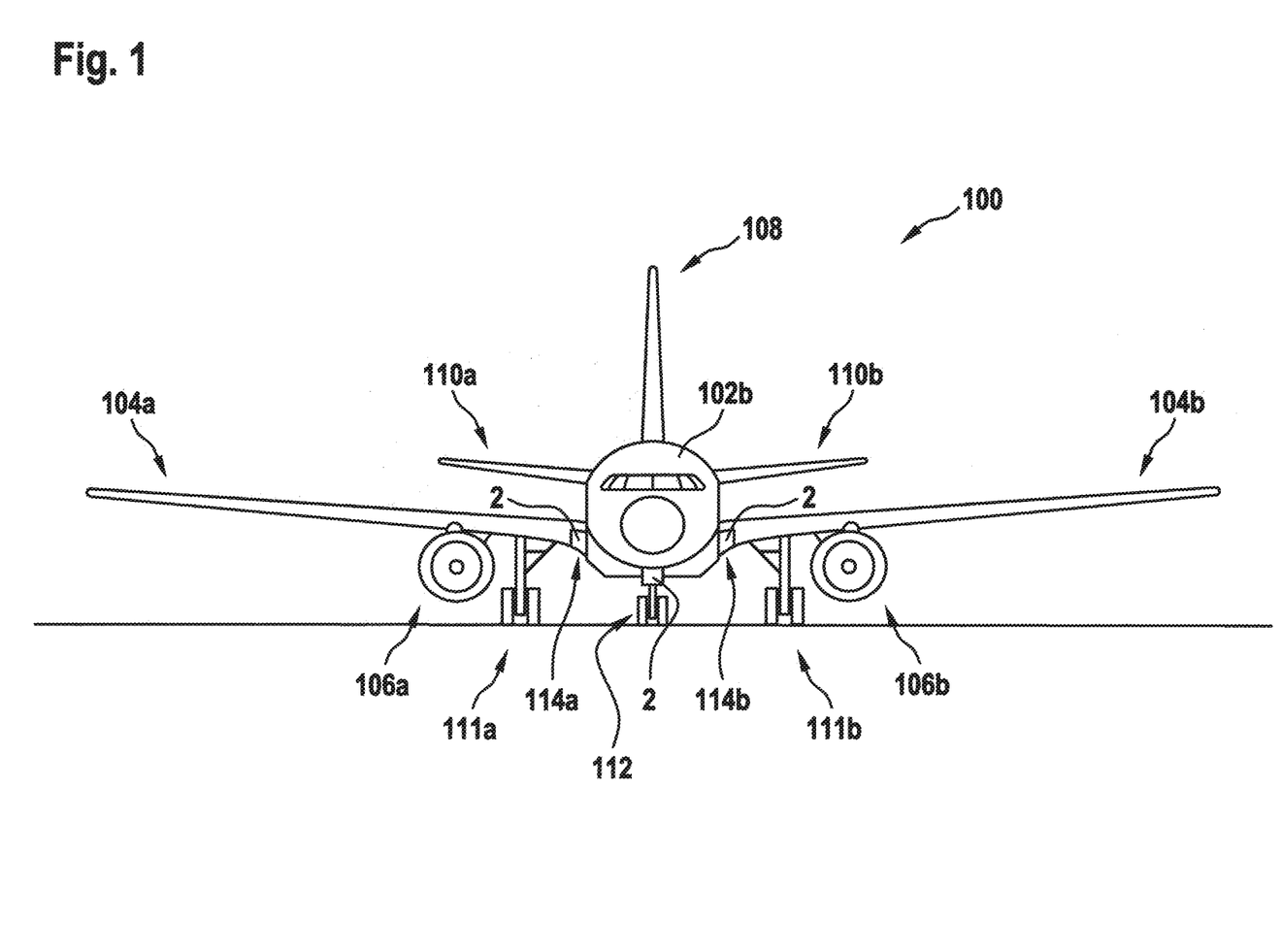
FIG. 1 depicts a schematic front view of an aircraft in accordance with an exemplary embodiment of the invention.

FIG. 1 depicts a schematic front view of an aircraft 100, comprising three aircraft headlights 2 in accordance with exemplary embodiments of the invention.

The aircraft 100 has a fuselage 102 and two wings 104a, 104b, extending laterally from the right and left sides of the fuselage 102. Each of the wings 104a, 104b supports an engine 106a, 106b. In further exemplary embodiments, which are not depicted in the figures, each of the wings 104a, 104b may support more than one engine 106a, 106b, each of the wings 104a, 104b may in particular support two engines 106a, 106b, respectively. In further embodiments, one or more engines 106a, 106b may be mounted to the fuselage 102 as well.

A vertical stabilizer 108 and two horizontal stabilizers 110a, 110b are mounted to a tail portion of the fuselage 102.

The aircraft 100 further comprises a landing gear configuration, including two main gears 111a, 111b, which are arranged under the wings 104a, 104b, and a front gear 112, which is located under a front portion of the fuselage 102. Other landing gear configurations, in particular landing gear configurations comprising more than two main gears 111a, 111b, are possible as well.

An aircraft headlight 2 is mounted to the front gear 112. Additional aircraft headlights 2 are provided at the roots 114a, 114b of the wings 104a, 104b next to the fuselage 102.

Each of the aircraft headlights 2 may be an aircraft take-off light, an aircraft landing light, an aircraft taxi light, a runway turn-off light, or a multi-functional light combining at least two functionalities of an aircraft take-off light, an aircraft landing light an aircraft taxi light, and a runway turn-off light.

The aircraft headlight configuration, depicted in FIG. 1, is only exemplary and not limiting. In other words, other aircraft headlight configurations comprising at least one aircraft headlight 2 are possible as well. Aircraft headlights 2 may also be mounted to other components of the aircraft 100.

The aircraft 100 shown in FIG. 1 is an air plane 100, in particular a large commercial passenger or cargo air plane 100. It is pointed out that other types of aircraft, such as smaller air planes 100, may be equipped with aircraft headlights 2 in accordance with exemplary embodiments of the invention as well. Aircraft headlights 2 according to exemplary embodiments of the invention may in particular be mounted to helicopters, too.

Figure 2:
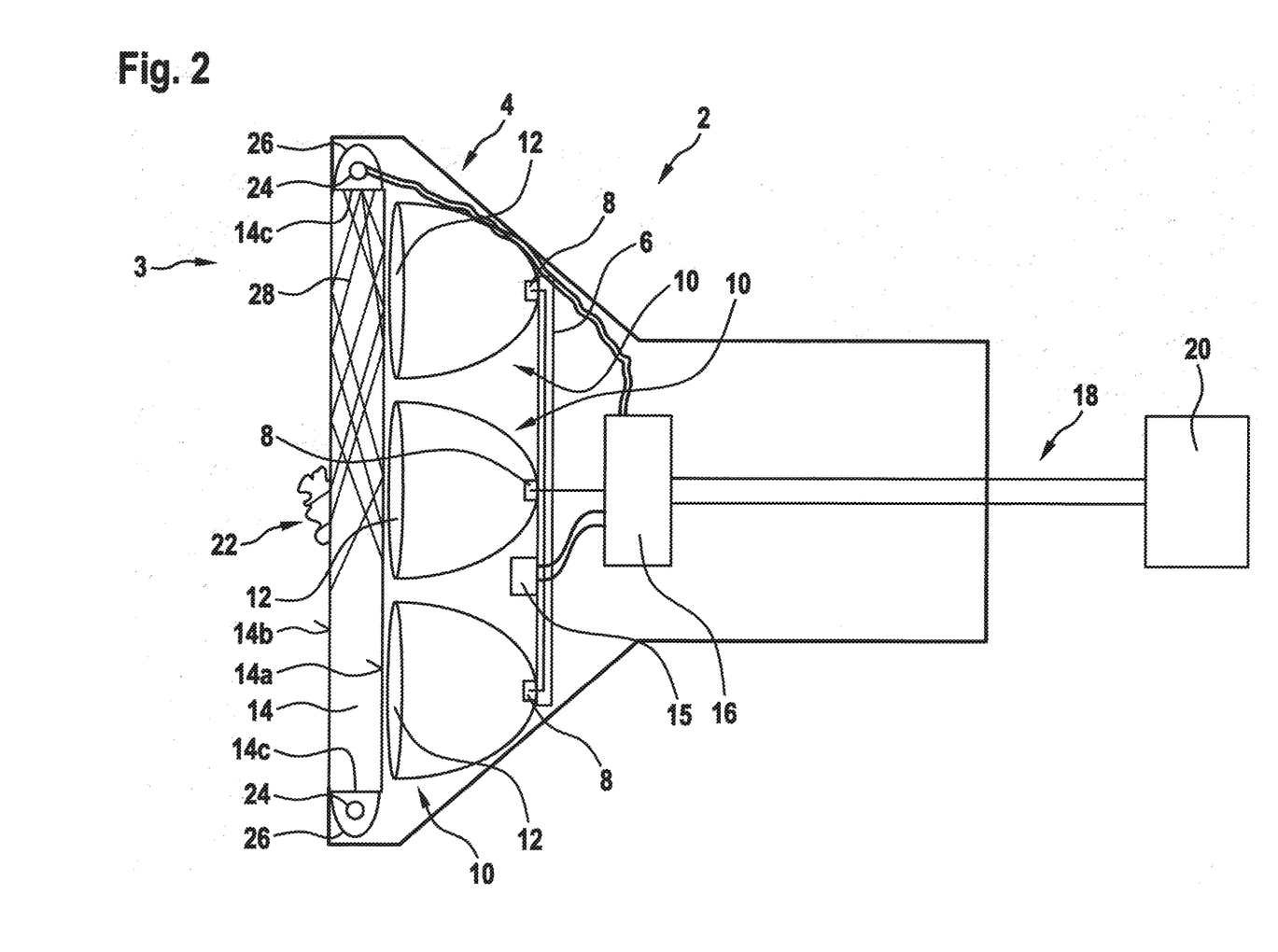
FIG. 2 shows a schematic cross-sectional view of an aircraft headlight according to an exemplary embodiment of the invention.

FIG. 2 shows a schematic cross-sectional view of an aircraft headlight 2 according to an exemplary embodiment of the invention. The depicted cross-section view may also be considered a cross-sectional side view, i.e. a cross-sectional view onto a vertical cross-sectional plane, when the aircraft headlight 2 is in its normal operating position.

The aircraft headlight 2 comprises a housing 4, which may be mounted to landing gear 111a, 111b, 112, to a wing 104a, 104b, or to the fuselage 102 of an aircraft 100, as it is depicted in FIG. 1.

The aircraft headlight 2 further comprises a light source support 6, for example a printed circuit board, which is arranged within the housing 4 and supports at least one visible light source 8. In the exemplary embodiment depicted in FIG. 2, the light source support 6 supports three visible light sources 8. In alternative configurations, which are not explicitly shown in the figures, the light source support 6 may support more or less than three visible light sources 8.

The at least one visible light source 8 is configured for emitting a visible light output, i.e. a light output comprising predominantly visible light, typically white light, for providing a visible aircraft headlight light output. The at least one visible light source 8 may in particular be configured for providing a light output comprising at least 80% of visible light.

The at least one visible light source 8 may be an LED or comprise at least one LED. LEDs are very efficient in outputting visible light and produce only a small amount of waste heat.

For forming the light, emitted by the at least one visible light source 8, into the desired aircraft headlight light output, at least one optical component 10, 12, such as a reflector 10 and/or a lens 12, is associated with each visible light source 8, respectively.

The aircraft headlight 2 further comprises a light transmissive cover 14, which is arranged at a light output side 3 of the aircraft headlight 2, for protecting the at least one visible light source 8 and the associated optical components 10, 12 from adverse environmental influences, such as water, dirt and/or mechanical impact.

The light transmissive cover 14 comprises an inner light input surface 14a, facing the at least one visible light source 8 and the associated optical components 10, 12, and an opposite outer light output surface 14b, facing the light output side 3 of the aircraft headlight 2. The light transmissive cover 14 further comprises at least one lateral surface 14c, extending between the inner light input surface 14a and the outer light output surface 14b, in particular along the circumferences of the inner light input surface 14a and the outer light output surface 14b.

Light emitted by the at least one visible light source 8 enters into the light transmissive cover 14 through the inner light input surface 14a, passes the light transmissive cover 14, and exits the light transmissive cover 14 through the opposite outer light output surface 14b.

The aircraft headlight 2 further comprises power supply lines 18 for electrically connecting the aircraft headlight 2 to an electric power supply system 20 of the aircraft 100.

Depending on the type of aircraft 100, in which the aircraft headlight 2 is to be installed, the aircraft headlight 2 may be configured for operating with electric AC power having a voltage of between 100 V and 130 V, in particular a voltage of 115 V. Additionally or alternatively, the aircraft headlight 2 may be configured for operating with electric DC power having a voltage of between 20 V and 40 V, in particular a voltage of 28 V.

In case of low ambient temperatures, in particular in case of ambient temperatures below 0° C., ice 22 may form on the outer light output surface 14b of the light transmissive cover 14. Ice 22 forming on the outer light output surface 14b of the light transmissive cover 14 may deteriorate the optical properties of the light transmissive cover 14 and, in consequence, may also deteriorate the headlight output emitted by the aircraft headlight 2.

Therefore, it is desirable to remove the ice 22 formed on the outer light output surface 14b of the light transmissive cover 14 as fast as possible, when the aircraft headlight 2 is activated.

According to exemplary embodiments of the invention, ice 22 formed on the outside of the light transmissive cover 14 is removed by melting the ice 22 using infrared radiation 28.

In order to melt the ice 22 very quickly, after the aircraft headlight 2 has been activated, an aircraft headlight 2 according to an exemplary embodiment of the invention comprises at least one infrared emitter 24, which is configured for emitting infrared radiation 28 towards the light transmissive cover 14.

In the exemplary embodiment depicted in FIG. 2, at least one infrared emitter 24 is provided at the outer circumference of the light transmissive cover 14. The at least one infrared emitter 24 is configured for emitting infrared radiation 28 into the light transmissive cover 14 through the at least one lateral surface 14c of the light transmissive cover 14.

The infrared emitter 24 may be a circumferential, for example a circu-lar, infrared emitter 24 extending circumferentially around the outer circumference of the light transmissive cover 14. Alternatively, the aircraft headlight 2 may comprise one or more infrared emitters 24 which are arranged at one or more lateral surface(s) 14c of the light transmissive cover 14.

The aircraft headlight 2 may further comprise at least one infrared reflector 26, which is associated with the at least one infrared emitter 24 and configured for directing and optionally focusing the infrared radiation 28, emitted by the at least one infrared emitter 24, towards the light transmissive cover 14. Employing at least one infrared reflector 26 may enhance the efficiency of the at least one infrared emitter 24.

In the configuration depicted in FIG. 2, infrared radiation 28 emitted by the at least one infrared emitter 24 enters into the light transmissive cover 14 via at least one lateral surface 14c of the light transmissive cover 14. After having entered into the light transmissive cover 14, the infrared radiation 28 is reflected by the inner light input surface 14a and the outer light output surface 14b of the light transmissive cover 14 until it reaches a portion of the outer light output surface 14b which is covered by ice 22. The infrared radiation 28 is absorbed by said ice 22, thereby heating and melting the ice 22.

The aircraft headlight 2 may comprise at least one temperature sensor 15 and a controller 16. The at least one temperature sensor 15 may be configured for detecting a temperature within the aircraft headlight 2 and providing an associated temperature sensor signal to the controller 16.

The controller 16 may be configured for controlling the operation of the aircraft headlight 2, in particular for controlling the operation of the at least one infrared emitter 24 based on the temperatures detected by the at least one temperature sensor 15. The controller 16 may, for example, activate the at least one infrared emitter 24 for a predefined amount of time, after the aircraft headlight 2 has been activated, if the temperature detected by the least one temperature sensor 15 is below a predetermined threshold. The predetermined threshold may, for example, be 0° C., or a temperature in the range of between 0° C. and +10° C., in particular a temperature in the range of between 0° C. and +5° C.

Figure 3:
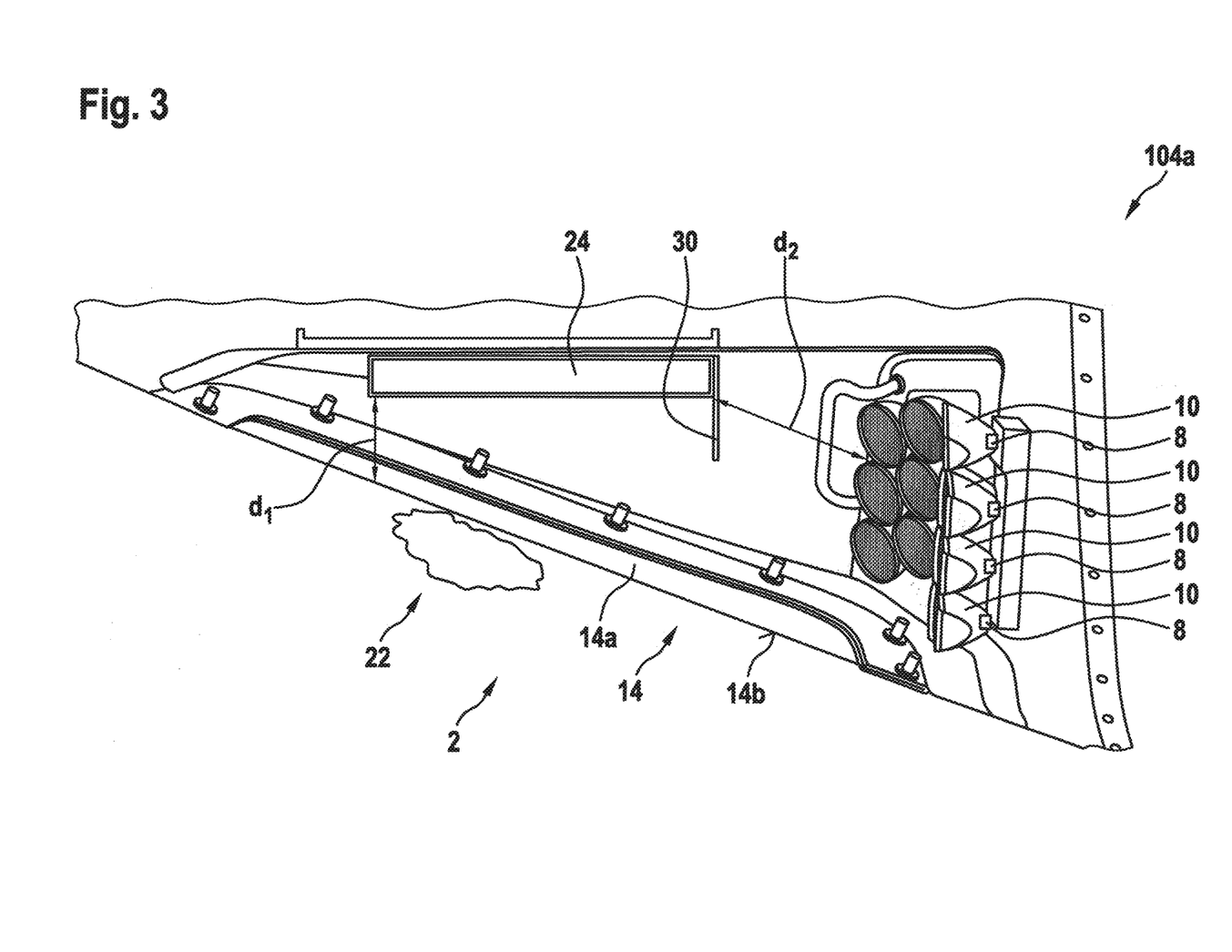
FIG. 3 shows a schematic, partially cross-sectional view of an aircraft headlight according to another exemplary embodiment of the invention.

FIG. 3 shows a schematic, partially cross-sectional side view of an aircraft headlight 2 according to another exemplary embodiment of the invention. FIG. 3 in particular shows an exemplary embodiment of an aircraft headlight 2 located at a root 114a of a wing 104a of an aircraft 100 (cf. FIG. 1).

Similar to the embodiment depicted in FIG. 2, the aircraft headlight 2 depicted in FIG. 3 comprises a plurality of visible light sources 8 in combination with associated optical elements, in particular reflectors 10, for emitting a visible aircraft headlight light output.

The aircraft headlight 2 depicted in FIG. 3 also comprises a light transmissive cover 14 and an infrared emitter 24 for emitting infrared radiation 28 towards the light transmissive cover 14.

Different from the embodiment depicted in FIG. 2, the infrared emitter 24 depicted in FIG. 3 is not configured for emitting infrared radiation 28 through a lateral surface 14c of the light transmissive cover 14. Instead, the infrared emitter 24 is configured for emitting infrared radiation 28 onto the inner light input surface 14a of the light transmissive cover 14, facing the visible light sources 8 and the infrared emitter 24.

In the exemplary embodiment of an aircraft headlight 2 depicted in FIG. 3, the infrared radiation 28, emitted by the infrared emitter 24, passes the light transmissive cover 14 for heating ice 22, formed on the outer light output surface 14b of the light transmissive cover 14. A portion of the infrared radiation 28 which does not pass the light transmissive cover 14, as it is absorbed by the light transmissive cover 14, heats the light transmissive cover 14. Heating the light transmissive cover 14 also contributes to melting ice 22 formed on the outer light output surface 14b of the light transmissive cover 14. Heating the light transmissive cover 14, however, is less efficient than heating the ice 22 directly by infrared radiation 28 absorbed by the ice 22.

For melting ice 22 formed on the outer light output surface 14b of the light transmissive cover 14 efficiently and in order reduce an undesirable heating of the visible light sources 8 by the infrared radiation 28 emitted by the infrared emitter 24, the distance d1 between the infrared emitter 24 and the light transmissive cover 14 may be smaller than the distance d2 between the infrared emitter 24 and the visible light sources 8.

The distance d1 between the infrared emitter 24 and the light transmissive cover 14 may, for example, be in the range of 35 mm to 350 mm.

The distance d2 between the infrared emitter 24 and the visible light sources 8 may, for example, be in the range of 50 mm to 500 mm.

Alternatively or additionally, the aircraft headlight 2 may be configured such that the amount of infrared radiation 28 emitted by infrared emitter 24, which reaches the visible light sources 8, is reduced. The aircraft headlight 2 may, for example, comprise a shield 30, which prevents infrared radiation 28 emitted by the infrared emitter 24 from reaching the visible light sources 8.

The aircraft headlight 2 may be configured such that a considerable portion, for example at least 85% or at least 90%, of the visible headlight light output passes through limited portions of the light transmissive cover 14. Said limited portions may in particular cover only a portion of the total area of the light transmissive cover 14. In such a configuration, it may be beneficial to concentrate the infrared radiation 28, emitted by the infrared emitter 24, onto said limited portions, in order to use the infrared radiation 28 emitted by the infrared emitter 24 highly efficiently.

Figure 4:
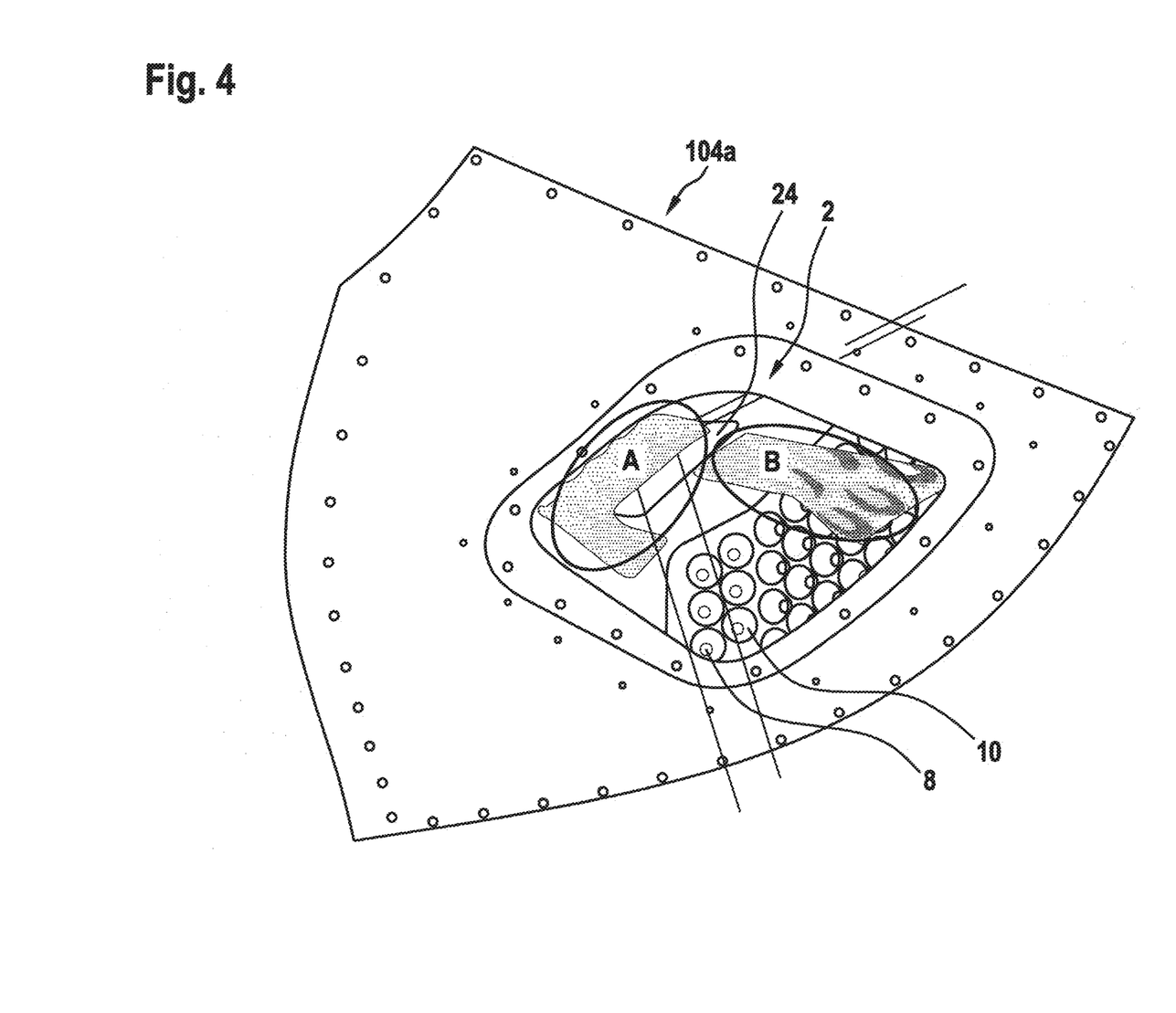
FIG. 4 shows an outer view of the aircraft headlight depicted in FIG. 3, in which portions of the light transmissive cover, through which most of the visible headlight light output is emitted, are marked-up.

An example of such a configuration is depicted in FIG. 4.

A large portion of the visible light output, in particular at least 85% or 90% of the visible headlight output emitted by the visible light sources 8, passes through the light transmissive cover 14 in portions A and B, depicted in FIG. 4. In such a configuration the other, non-marked portions of the light transmissive cover 14 are almost negligible. In order words, ice 22 formed on the light transmissive cover 14 outside areas A and B does not considerably deteriorate the headlight light output of the aircraft headlight 2.

In order to use the infrared radiation 28 emitted by the infrared emitter 24 in a highly efficient manner, it may be beneficial to concentrate the infrared radiation 28, emitted by the at least one infrared emitter 24, onto said portions A and B, so that ice 22 formed on these portions A and B will be heated fast and melted first. Such a configuration results in a fast improvement of the visible headlight light output, provided by the aircraft headlight 2, after the infrared emitter 24 has been activated.

Melting ice 22 formed on the light transmissive cover 14 by means of infrared radiation 28 is particularly efficient when a large percentage of the infrared radiation 28, irradiated onto the ice 22, is absorbed by the ice 22, and only a small percentage of said infrared radiation 28 passes the ice 22 and/or is reflected by the ice 22 without being absorbed.

It is therefore beneficial to adjust the infrared radiation 28, emitted by the infrared emitter 24, to the absorption properties of ice 22.

Figure 5:
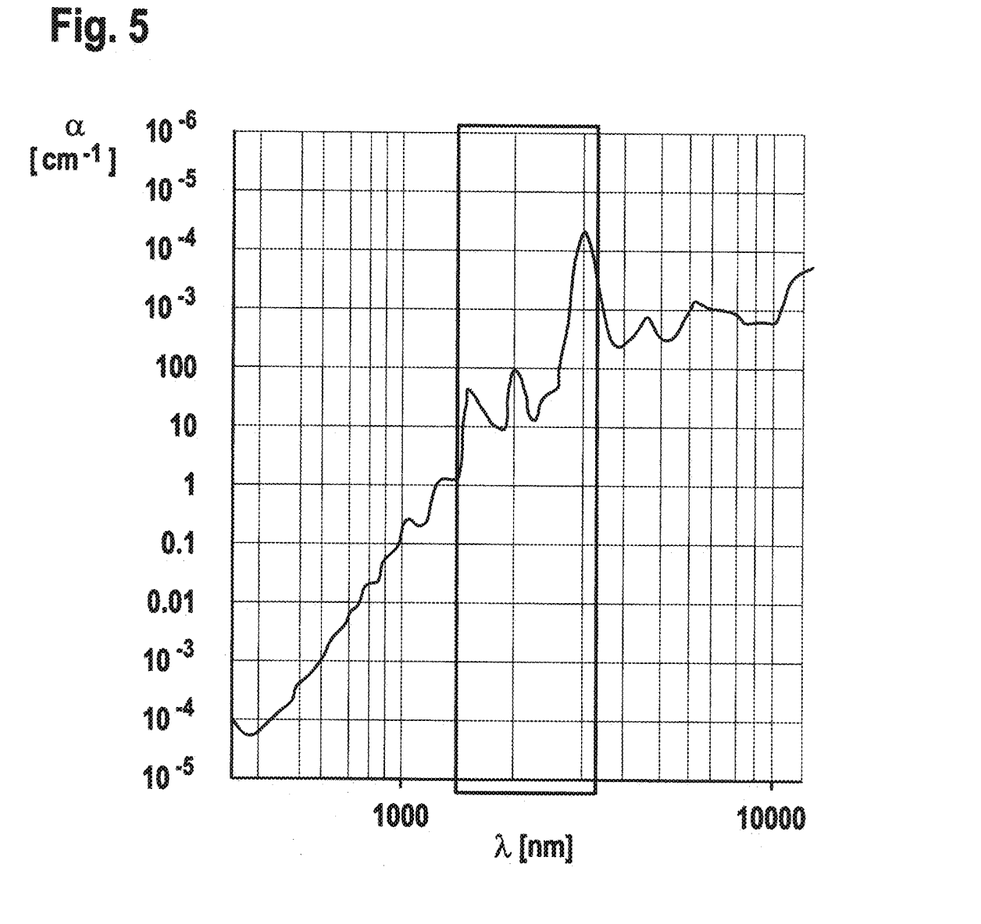
FIG. 5 is a graph illustrating the absorption coefficient α of ice with respect to electromagnetic radiation as a function of the wavelength λ of the electromagnetic radiation.

FIG. 5 shows a graph, in which the absorption coefficient $\alpha$ of ice 22 with respect to electromagnetic radiation is plotted on the vertical axis as a function of the wavelength $\lambda$ of the electromagnetic radiation. The wavelength $\lambda$ is plotted on a logarithmic scale extending along the horizontal axis of the graph.

FIG. 5 shows that the absorption coefficient $\alpha$ of ice 22 is relatively high for electromagnetic radiation in the range of between 1500 nm and 3000 nm, in particular in the range of infrared radiation 28 having wavelengths in the range of between 2600 nm and 3000 nm. In other words, a large percentage of infrared radiation 28 having wavelengths in this range is absorbed by ice 22, so that infrared radiation 28 having wavelengths in this range is very efficient for melting ice 22.

In consequence, it may be beneficial to configure the at least one infrared emitter 24, which is employed in an aircraft headlight 2 according to an exemplary embodiment of the invention, to predominantly emit infrared radiation 28 having wavelengths in the range of between 1500 nm and 3000 nm, in particular infrared radiation 28 having wavelengths in the range of between 2600 nm and 3000 nm.

The at least one infrared emitter 24, employed in an aircraft headlight 2 in accordance with exemplary embodiments of the invention, may in particular be configured such that at least 85%, more particularly at least 90%, of the energy emitted by the at least one infrared emitter 24 is emitted as infrared radiation 28 having wavelengths in the range of between 1500 nm and 3000 nm, in particular infrared radiation 28 having wavelengths in the range of between 2600 nm and 3000 nm.

In order to cause a fast melting of ice 22 formed on the light transmissive cover 14, the at least one infrared emitter 24 may be configured for irradiating the light transmissive cover 14, or at least the relevant portions A, B of the light transmissive cover 14 (see FIG. 4), with infrared radiation 28 having an energy density of at least 0.155 W/cm2 (1 W/inch2), in particular with infrared radiation 28 having an energy density of at least 0.310 W/cm2 (2 W/inch2), on the light transmissive cover. Also, the infrared irradiation 28 may have an energy density of at most 3.1 W/cm2 (20 W/inch2) on the light transmissive cover.

The at least one infrared emitter 24 may, for example, be a carbon infrared emitter 24. Carbon infrared emitters 24 are very efficient in producing infrared radiation 28 having wavelengths $\lambda$ in the above mentioned preferable ranges, i.e. infrared radiation 28 which is very efficient in melting ice 22. Carbon infrared emitters further have a small start-up time, reaching their maximum power output within only a few seconds after start-up, for example within only approximately 2 to 5 seconds after being activated.

The carbon emitters may have a total power capacity in the range of 100 W to 240 W. Such a power capacity may allow for a fast melting of the ice 22, without overloading the electric power supply system 20 of the aircraft 100.

Carbon infrared emitters 24 having a longitudinal dimension or length of 25 mm to 100 mm, in particular a longitudinal dimension of 25 mm to 75 mm, more particularly a longitudinal dimension of about 50 mm, have been found as well-suited for being installed within typical aircraft headlights 2.

The infrared radiation 28 emitted by the at least one infrared emitter 24 needs to pass the light transmissive cover 14 before it reaches the ice 22 formed on the outer light output surface 14b of the light transmissive cover 14.

In order to use the infrared radiation 28, emitted by the at least one infrared emitter 24, very efficiently for melting ice 22 formed on the outer light output surface 14b of the light transmissive cover 14, it is desirable that the percentage of infrared radiation 28, which is absorbed by the light transmissive cover 14, is small.

Conventionally, the light transmissive cover 14 is frequently made of acrylic glass. Acrylic glass, however, has a relatively high absorption coefficient, which is equivalent to a relatively low transmission coefficient T, for electromagnetic radiation having wavelengths in the range of 1500 nm to 3000 nm, which is beneficial for melting ice, as it has been discussed before. More specifically, a typical average transmission coefficient T of acrylic glass in the desirable range of wavelengths, i.e. wavelengths in the range of between 1500 nm and 3000 nm, is less than 35%.

In consequence, a considerably large portion of the infrared radiation 28, emitted by the at least one infrared emitter 24, would be absorbed by a light transmissive cover 14 made of acrylic glass. This would result in a low efficiency of melting ice 22, formed on the light transmissive cover 14, by means of infrared radiation 28.

In order to enhance the efficiency of melting ice, formed on a light output surface of an aircraft headlight 2 according to exemplary embodiments of the invention, other materials than acrylic glass, in particular materials having a larger transmission coefficient T for infrared radiation 28 in the range of between 1500 nm and 3000 nm, may be used for forming the light transmissive cover 14.

Figure 6:
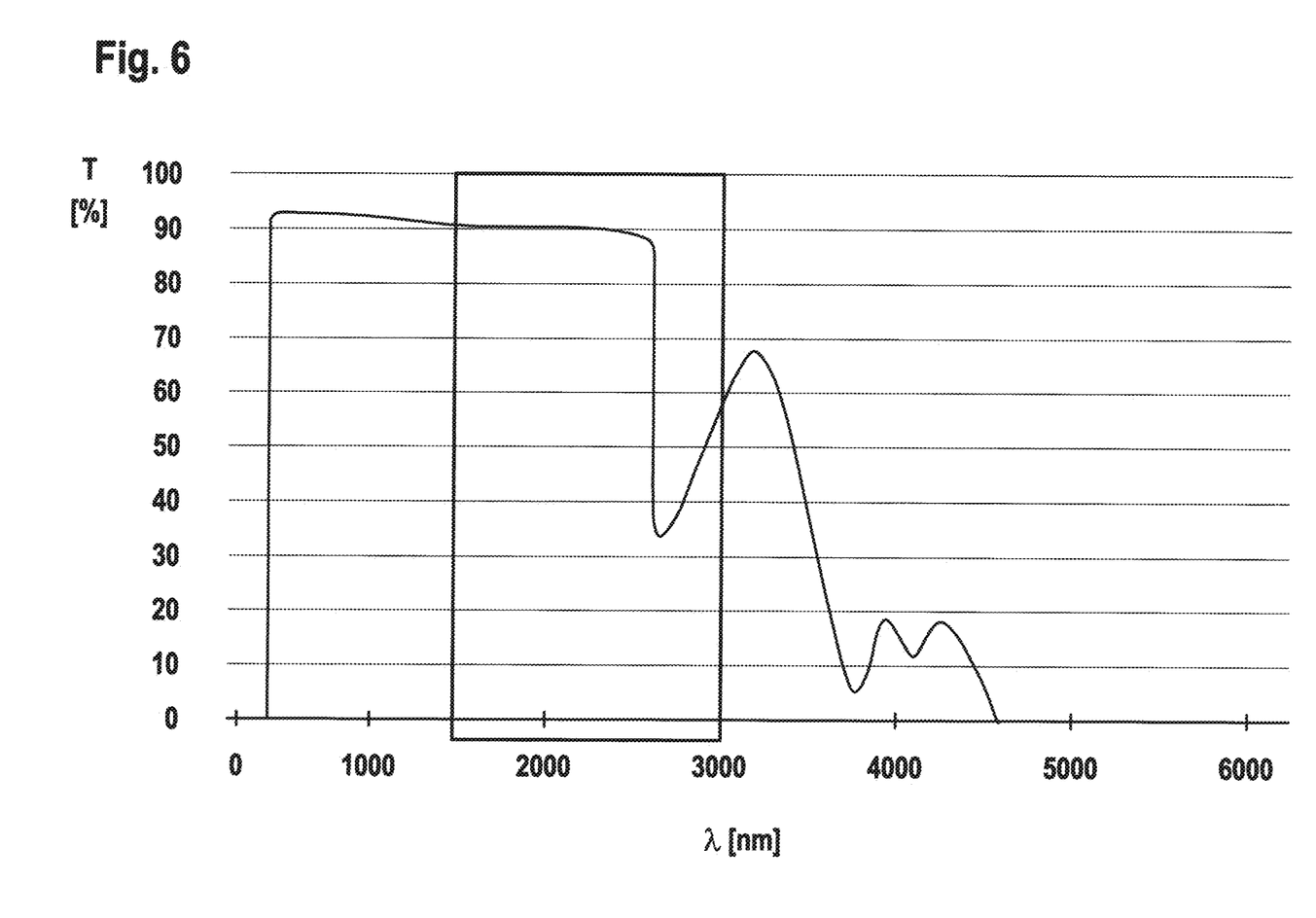
FIG. 6 depicts the transmission coefficient of borosilicate glass as a function of the wavelength.

FIG. 6 depicts the transmission coefficient T of a borosilicate glass having a thickness of 1 mm. The transmission coefficient T is plotted on the vertical axis, as a function of the wavelength $\lambda$ of the infrared radiation 28, which is plotted on the horizontal axis.

FIG. 6 shows that, over a wide range of wavelenghths $\lambda$ the transmission coefficient T of borosilicate glass is significantly larger than 35%, which is a typical transmission coefficient T of acrylic glass.

Figure 7:
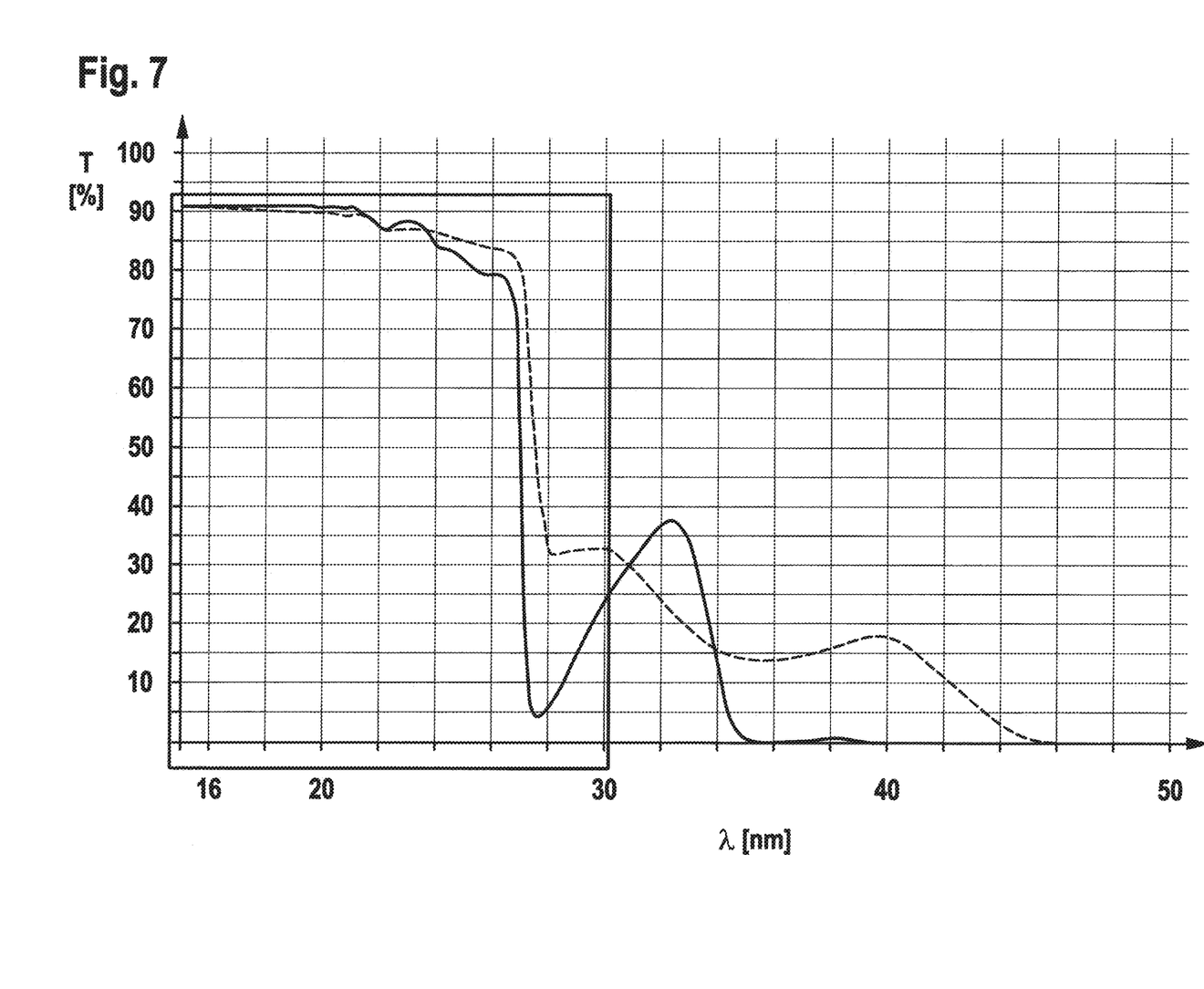
FIG. 7 depicts the transmission coefficients of specialized glasses, comprising a high-volume content of quartz/silica, as a function of the wavelength.

Even better transmission properties of the light transmissive cover 14 may be achieved by using specialized glasses, which comprise a high volume content of quartz/silica, such as glasses which are known as N-BK7 glass or as N-B270 glass, respectively.

In FIG. 7, the transmission coefficients T of these glasses, having a thickness of 3 mm, are plotted as a function of the wavelength 2. The solid curve illustrates the transmission coefficient T of N-BK7 glass, and the dashed curve illustrates the transmission coefficient T of N-B270 glass.

In the relevant range of wavelengths $\lambda$ between 1500 nm to 3000 nm, the glasses show an average transmission coefficient T of more than 75%. In consequence, forming the light transmissive cover 14 from these glasses may allow for considerably improving the efficiency of deicing the light output surface of an aircraft headlight 2 by infrared radiation 28.

Figure 8:
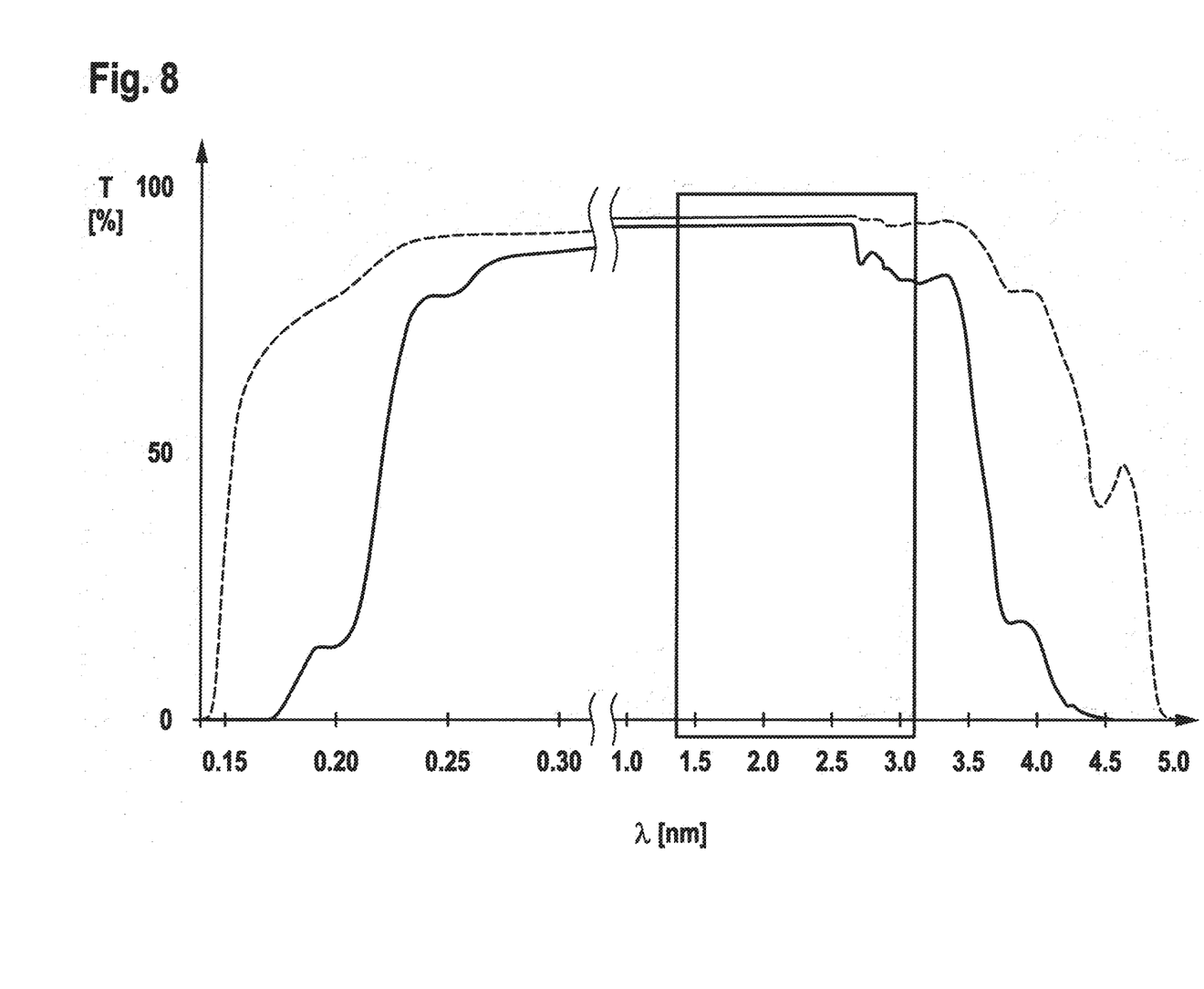
FIG. 8 depicts the transmission coefficient of pure silica, which has been purified from OH content, and which is known as "IR-quartz" and/or "fused silica".

Similar or even more pronounced effects may be achieved by forming the light transmissive cover 14 from pure silica, which has been purified from OH content. Glasses of these type are known as "IR-quartz" and/or "fused silica".

In FIG. 8, the transmission coefficients T of such glasses are plotted as a function of the wavelength 2. In FIG. 8, the dashed line indicates the transmission coefficient T of a glass having a thickness of 1 mm, and the solid line indicates the transmission coefficient T of a glass having a thickness of 10 mm.

FIG. 8 shows that, in the favorable range of wavelengths λ between 1500 nm to 3000 nm, transmission coefficients T of up to almost 90% may be reached, even for a "thick" glass having a thickness of 10 mm. Forming the light transmissive cover 14 from "IR-quartz" and/or "fused silica" may therefore allow for a very efficient deicing of the light transmissive cover 14 using infrared radiation 28, which passes the light transmissive cover 14, as it has been described before.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An aircraft headlight, comprising:
   at least one visible light source for emitting a headlight light output;
   a light transmissive cover, at least partially covering the at least one visible light source; and
   at least one infrared emitter for emitting infrared radiation;
   wherein at least 90% of radiation energy, comprised in the infrared radiation emitted by the at least infrared emitter, is emitted within a predefined wavelength range;
   wherein the light transmissive cover allows at least 25% of the radiation energy, which is emitted within the predefined wavelength range, to pass through the light transmissive cover;
   wherein the light transmissive cover has an inner light input surface, an opposing outer light output surface and at least one lateral surface extending between the inner light input surface and the outer light output surface,
   wherein the at least one visible light source is arranged opposite to the inner light input surface so that the headlight light output emitted from the at least one visible light source enters into the light transmissive cover through the inner light input surface and exits from the light transmissive cover through the outer light output surface, and
   wherein the at least one infrared emitter is arranged at the at least one lateral surface of the light transmissive cover so that the infrared radiation emitted by the at least one infrared emitter enters through the lateral surface into the light transmissive cover.

2. The aircraft headlight according to claim 1, wherein the light transmissive cover allows at least 30% of the radiation energy, which is emitted within the predefined wavelength range, to pass through the light transmissive cover.

3. The aircraft headlight according to claim 1, wherein the aircraft headlight is an aircraft landing light and the at least one visible light source is at least one landing light source.

4. The aircraft headlight according to claim 1, wherein the light transmissive cover comprises quartz and/or silica.

5. The aircraft headlight according to claim 1, wherein the light transmissive cover allows at least 45% of the radiation energy, which is emitted within the predefined wavelength range, to pass through the light transmissive cover.

6. The aircraft headlight according to claim 1, wherein the light transmissive cover comprises N-B270 glass.

7. The aircraft headlight according to claim 1, wherein the light transmissive cover comprises pure silica glass.

8. The aircraft headlight according to claim 1, wherein the light transmissive cover comprises IR-Quartz glass.

9. The aircraft headlight according to claim 1, wherein the light transmissive cover comprises fused silica glass.

10. The aircraft headlight according to claim 1, wherein the predefined wavelength range is from 1500 nm to 3000 nm.

11. The aircraft headlight according to claim 1, wherein the at least one infrared emitter includes at least one carbon infrared light emitter.

12. The aircraft headlight according to claim 1, wherein the at least one visible light source and the at least one infrared emitter are switchable independently of each other.

13. The aircraft headlight according to claim 1, wherein the at least one visible light source and the at least one infrared emitter are operable with electric AC power having a voltage of between 100 V and 130 V.

14. The aircraft headlight according to claim 1, further comprising at least one temperature sensor and a controller, wherein the controller is configured for controlling the operation of the at least one infrared emitter based on a temperature detected by the at least one temperature sensor.

15. An aircraft comprising at least one aircraft headlight according to claim 1.

16. A method of operating an aircraft headlight comprising at least one visible light source, a light transmissive cover, and at least one infrared emitter, wherein the method comprises:
   emitting a visible headlight light output through the light transmissive cover, wherein the visible headlight light output enters into the light transmissive cover through an inner light input surface of the light transmissive cover and exits from the light transmissive cover through an outer light output surface of the light transmissive cover; and
   emitting infrared radiation onto the light transmissive cover, wherein the infrared radiation enters through a lateral surface of the light transmissive cover into the light transmissive cover;
   wherein at least 90% of radiation energy, comprised in the infrared radiation, is emitted within a predefined wavelength range;
   wherein the light transmissive cover allows at least 25% of the radiation energy, which is emitted within the predefined wavelength range, to pass through the light transmissive cover.

* * * * *